Patented Apr. 22, 1924.

1,491,567

UNITED STATES PATENT OFFICE.

ARTHUR P. TAYLOR, OF CINCINNATI, OHIO, ASSIGNOR TO THE CHAS. TAYLOR SONS COMPANY, OF CINCINNATI, OHIO, A CORPORATION OF OHIO.

REFRACTORY PRODUCT.

No Drawing.     Application filed May 8, 1923. Serial No. 637,592.

*To all whom it may concern:*

Be it known that I, ARTHUR P. TAYLOR, a citizen of the United States, residing at Cincinnati, county of Hamilton, and State of Ohio, have invented a new and useful Improvement in Refractory Products, of which the following is a full, clear, and exact description.

The present invention relates to a new refractory product adapted for use in furnace work where a highly refractory material is desirable.

In United States Patent No. 1,212,846, of January 16, 1917, granted to myself and James Donald Runyan, jointly, there is described a refractory product comprising flint clay and kaolin. While this product has proven much more satisfactory than ordinary fire clay brick, in which flint clay and plastic fire clay are employed, I have discovered, as a result of exhaustive experiments, that a much superior refractory product may be produced by using diaspor instead of flint clay with kaolin as the bonding material.

I have found that diaspor, mixed with kaolin, produces a product which is more highly refractory and more slag-resisting than the product made in accordance with the patent above referred to. In fact, I have found that Burley flint clay, which contains some diaspor, when mixed with kaolin, gives a better refractory product than does ordinary flint clay mixed with kaolin. The refractory product made in accordance with the patented process has a fusing point of approximately cone 33, whereas my improved product has a fusing point of approximately cone 37. I attribute the relatively higher refractoriness of my improved product as compared with that made by using flint clay mixed with kaolin to the fact that diaspor, as it comes from the mines, contains a much higher percentage of alumina and a smaller percentage of silica than does ordinary flint clay. Moreover, I believe that it is for the same reason that my improved product is more slag-resisting than the product made in accordance with the process described in the patent. In combination with basic oxides or basic slags, diaspor does not form a fluid or low melting glass nearly as readily as does the more siliceous flint clay. When alumina is dissolved in a glass or slag, it markedly increases the viscosity of the glass or slag, so that the glass or slag will adhere and not run away, as would be the case if the glass or slag were more siliceous, and so a refractory material having a relatively high alumina content as compared with its silica content fluxes away at a comparatively slow rate.

The process for producing my improved refractory product is similar to that described in the patent referred to. The raw diaspor is preferably calcined to render impurities contained therein visible, and these impurities manually removed, as described in the patent to Arthur P. Taylor and James Donald Runyan, No. 1,212,847, of January 16, 1917. The calcined diaspor is crushed and mixed with kaolin in suitable proportions to insure a firm bond, best results being obtained by using a mixture of two different kaolins, one being of a relatively high plastic nature and dense burning and having a relatively low vitrification point, and the other being less plastic and open burning and having a relatively high vitrification point. The relative proportions of the materials may be widely varied, but I prefer to use a mixture consisting of eighteen parts by measure of diaspor, preferably calcined as above described, five parts by measure of the more highly plastic and dense burning kaolin, and three parts by measure of the less plastic and open burning kaolin. To this mixture of calcined diaspor and kaolins, enough water is added to give sufficient coherence to the mass to enable it to be shaped. I may also add some temporary bonding material of a glutinous character, such as sugar or molasses, to hold the mass in shape while placing it in the firing kilns, and which will burn out at the firing temperatures. The mixture is pressed in the molds, dried, and then placed in the burning kiln, where it is subjected to a relatively high temperature.

While I prefer to use diaspor as the body-forming material, since this material is found in relatively large quantities in nature, is easily mined, and may have its impurities readily removed, I do not desire to limit myself to the use of pure diaspor, as I may use a more or less impure diaspor, or I may use diaspor in combination with other material, or I may use a diaspor-containing material, with kaolin as the bonding material, to obtain my superior refractory product. I also wish it to be understood that I do not desire to limit myself to the use of calcined diaspor, as in some cases, the raw material may be used.

I claim:

1. As a new article of manufacture, a refractory product containing diaspor and a binder composed of two different kaolins having different vitrification points, substantially as described.

2. As a new article of manufacture, a refractory product containing calcined diaspor and a binder composed of two different kaolins having two different vitrification points, substantially as described.

3. As a new article of manufacture, a refractory product containing diaspor and a binder composed of a kaolin of a relatively high plastic nature and which is dense burning and another kaolin of a relatively low plastic nature and which is open burning, substantially as described.

4. As a new article of manufacture, a refractory product containing diaspor and a binder composed of a kaolin of a relatively high plastic nature and which is dense burning and another kaolin of a relatively low plastic nature and which is open burning, the first named kaolin being in an amount in excess of the last named kaolin, substantially as described.

5. As a new article of manufacture, a refractory product containing more than 50% by measure of diaspor, and kaolin, substantially as described.

6. As a new article of manufacture, a refractory product containing by measure approximately 70% diaspor, and approximately 30% kaolin, substantially as described.

7. As a new article of manufacture, a refractory product consisting substantially of diaspor and kaolin and having a fusing point greater than cone 35, substantially as described.

In testimony whereof I have hereunto set my hand.

ARTHUR P. TAYLOR.